US010574046B2

(12) United States Patent
Okuhara

(10) Patent No.: US 10,574,046 B2
(45) Date of Patent: Feb. 25, 2020

(54) GROMMET AND GROMMET-EQUIPPED WIRE HARNESS

(71) Applicant: SUMITOMO WIRING SYSTEMS, LTD., Mie (JP)

(72) Inventor: Takashi Okuhara, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/073,610

(22) PCT Filed: Feb. 22, 2017

(86) PCT No.: PCT/JP2017/006550
§ 371 (c)(1),
(2) Date: Jul. 27, 2018

(87) PCT Pub. No.: WO2017/150296
PCT Pub. Date: Sep. 8, 2017

(65) Prior Publication Data
US 2019/0036317 A1    Jan. 31, 2019

(30) Foreign Application Priority Data

Mar. 1, 2016 (JP) .................................. 2016-038621

(51) Int. Cl.
*H02G 3/22* (2006.01)
*B60R 16/02* (2006.01)
(Continued)

(52) U.S. Cl.
CPC ........... *H02G 3/22* (2013.01); *B60R 16/0222* (2013.01); *F16B 21/183* (2013.01); *H01B 7/0045* (2013.01); *H01B 17/26* (2013.01)

(58) Field of Classification Search
None
See application file for complete search history.

(56) References Cited

U.S. PATENT DOCUMENTS 4,289,288 A * 9/1981 Gransberry .............. H02G 3/22
174/153 G
4,768,024 A * 8/1988 Hauff ....................... H02G 3/22
340/584
(Continued)

FOREIGN PATENT DOCUMENTS

| JP | 03-040823 | 4/1991 |
| JP | 03-053716 | 5/1991 |
| JP | 2015-186399 | 10/2015 |

OTHER PUBLICATIONS

Official Communication issued in International Bureau of WIPO Patent Application No. PCT/JP2017/006550, dated Mar. 21, 2017.

*Primary Examiner* — Timothy J Thompson
*Assistant Examiner* — Muhammed Azam
(74) *Attorney, Agent, or Firm* — Greenblum & Bernstein, P.L.C.

(57) ABSTRACT

A grommet includes a grommet main body made of an elastic material and an inner member. The grommet main body includes a cylinder portion and a large diameter portion that is formed so as to extend toward the outer circumference side from the cylinder portion, a ring-shaped portion that can be arranged on the inner circumference side of the attachment hole being formed on the outer circumferential portion. The grommet main body is fit into the attachment hole from one end side in the attachment direction of the large diameter portion.

14 Claims, 10 Drawing Sheets

(51) Int. Cl.
*F16B 21/18* (2006.01)
*H01B 7/00* (2006.01)
*H01B 17/26* (2006.01)

(56) References Cited

U.S. PATENT DOCUMENTS

| | | | | |
|---|---|---|---|---|
| 5,290,073 | A * | 3/1994 | Chen | F16L 5/08 277/621 |
| 5,343,103 | A * | 8/1994 | Aoki | H01B 17/26 174/77 R |
| 5,442,140 | A * | 8/1995 | McGrane | F16L 5/10 174/151 |
| 10,084,301 | B2 * | 9/2018 | Persson | H02G 3/22 |
| 2003/0226233 | A1 * | 12/2003 | Katayama | B60R 16/0222 16/2.1 |
| 2005/0139372 | A1 * | 6/2005 | Matsui | B60R 16/0222 174/650 |
| 2006/0001261 | A1 * | 1/2006 | Miyajima | F16L 5/10 285/136.1 |
| 2007/0137892 | A1 * | 6/2007 | Knagge | H02G 3/22 174/658 |
| 2009/0235484 | A1 * | 9/2009 | Bringhenti | B60R 16/0222 16/2.2 |
| 2010/0115728 | A1 * | 5/2010 | Kamenoue | B60R 16/0222 16/2.1 |
| 2011/0061897 | A1 * | 3/2011 | Okuhara | B60R 16/0222 174/153 G |
| 2011/0067201 | A1 * | 3/2011 | Okuhara | B60R 16/0222 16/2.1 |
| 2011/0073350 | A1 * | 3/2011 | Okuhara | B60R 16/0222 174/152 G |
| 2011/0265286 | A1 * | 11/2011 | Paku | B60R 16/0222 16/2.2 |
| 2013/0043059 | A1 * | 2/2013 | Okuhara | B60R 16/0222 174/152 G |
| 2013/0140060 | A1 * | 6/2013 | Baydoun | H02G 3/22 174/152 G |
| 2014/0054064 | A1 * | 2/2014 | Gronowicz, Jr. | B60R 16/0222 174/152 G |
| 2014/0115822 | A1 * | 5/2014 | Shishido | F16L 5/02 16/2.1 |
| 2014/0190725 | A1 * | 7/2014 | Baydoun | B60R 16/0222 174/153 G |
| 2015/0155079 | A1 * | 6/2015 | Martins Neto | H02G 15/013 174/153 R |
| 2015/0162733 | A1 * | 6/2015 | Smutny | H02G 3/22 174/152 G |
| 2015/0214706 | A1 * | 7/2015 | Feng | H02G 3/088 174/652 |
| 2015/0318680 | A1 * | 11/2015 | Solak | H02G 3/22 174/650 |
| 2016/0005516 | A1 * | 1/2016 | Okuhara | H02G 3/22 174/650 |
| 2016/0180988 | A1 * | 6/2016 | Klein | B64C 1/00 174/153 G |
| 2016/0254079 | A1 * | 9/2016 | Musick | H02G 3/22 174/153 G |
| 2016/0372906 | A1 * | 12/2016 | Wakabayashi | H02G 3/22 |
| 2017/0030498 | A1 * | 2/2017 | Chu | B29C 48/30 |
| 2017/0162299 | A1 * | 6/2017 | Komori | H01B 7/282 |
| 2018/0297542 | A1 * | 10/2018 | Schwimmbeck | B60R 16/0222 |
| 2019/0036317 | A1 * | 1/2019 | Okuhara | H02G 3/22 |

* cited by examiner

GROMMET AND GROMMET-EQUIPPED WIRE HARNESS

TECHNICAL FIELD

The present invention relates to a grommet to be equipped on a portion of a wire harness that is to be inserted through a through hole of a vehicle body panel.

BACKGROUND ART

Patent Document 1 discloses a grommet that is to be attached to an attachment hole formed in a panel, the grommet including a cylinder portion provided with a through hole through which a wire harness is to be inserted, and a diameter expansion portion that is formed so as to extend outward from the cylinder portion, the outer circumferential portion of the diameter expansion portion being provided with a ring-shaped groove into which a circumferential edge portion of the attachment hole can be fit.

CITATION LIST

Patent Documents

Patent Document 1: JP 2015-186399A

SUMMARY OF INVENTION

Problem to be Solved

With the grommet disclosed in Patent Document 1, when the grommet is inserted into the attachment hole formed in the panel, the diameter expansion portion needs to be pressed into the circumferential edge portion of the attachment hole to cause the diameter expansion portion to perform diameter expansion deformation. At this time, in order to reduce the insertion force of the grommet, the deformation amount of the grommet needs to be reduced or the grommet needs to be given a structure that deforms easily. Upon doing so, there is a risk that the holding force of the grommet will decrease in a state in which the grommet is attached to the attachment hole. For this reason, it has been difficult to achieve both a reduction of the insertion force of the grommet and an increase in the force with which the attachment hole holds the grommet.

In view of this, the present invention aims to make it possible to minimize the force needed when attaching the grommet to the attachment hole, and to maximize the holding force in the state in which the grommet is attached to the attachment hole.

Solution to the Problem

In order to solve the above-described problem, a first aspect is a grommet to be attached to an attachment hole formed in a panel, including: a grommet main body that is to be fit into the attachment hole from one end side in an axial direction of a large diameter portion, and that includes: a cylinder portion that is made of an elastic material and is provided with an insertion hole through which a wire harness is to be inserted; and the large diameter portion, which is formed so as to extend toward an external circumference side from the cylinder portion, and has an outer circumferential portion provided with a ring-shaped portion that can be arranged on an inner circumference side of the attachment hole; and an inner member that is arranged inside of the ring-shaped portion and that can perform a state change from an initial state to a diameter expansion state of causing the ring-shaped portion to elastically perform diameter expansion.

A second aspect is the grommet according to the first aspect, in which the inner member includes a pressing portion configured to elastically deform the ring-shaped portion so as to press the ring-shaped portion into the inner circumferential edge portion of the attachment hole in the diameter expansion state.

A third aspect is the grommet according to the second aspect, in which the ring-shaped portion includes a ring-shaped seal portion that is formed so as to protrude in a ring shape, and is pressed into the inner circumferential edge portion of the attachment hole in the axial direction of the attachment hole at a partial location.

A fourth aspect is the grommet according to any one of the first to third aspects, in which the inner member includes an inner member-side locking protrusion configured to, in the diameter expansion state, cause the ring-shaped portion to elastically deform such that the ring-shaped portion locks onto the circumferential edge portion of the attachment hole from one surface side of the panel.

A fifth aspect is the grommet according to the fourth aspect, in which the large diameter portion includes a grommet main body-side locking protrusion that is next to the ring-shaped portion, significantly protrudes with respect to the ring-shaped portion, and locks onto the circumferential edge portion of the attachment hole from another surface side of the panel.

A sixth aspect is the grommet according to the fourth or fifth aspect, in which at a portion of the ring-shaped portion that is elastically deformed by the inner member-side locking protrusion, a temporary locking protrusion that temporarily locks onto the circumferential edge portion of the attachment hole from the one surface side of the panel in a state prior to the elastic deformation is included.

A seventh aspect is the grommet according to any one of the first to sixth aspects, in which the inner member includes: an inner main body portion that includes a C-shaped diameter expansion deformation portion, a divided portion being formed on a portion in a circumferential direction of the diameter expansion deformation portion; and a diameter expansion portion that opens the divided portion by being inserted in the divided portion, causes the diameter expansion deformation portion to perform diameter expansion, and keeps the diameter expansion deformation portion in a diameter expansion state.

An eighth aspect is the grommet according to the seventh aspect, in which the inner main body portion includes a guiding portion configured to guide the diameter expansion portion from a standby position of being withdrawn from the divided portion, to an insertion position of being inserted into the divided portion.

A ninth aspect is the grommet according to the eighth aspect, in which a standby position holding protrusion that restricts movement of the diameter expansion portion from the standby position in a falling-out direction is formed on at least one of the inner member and the diameter expansion portion.

A tenth aspect is the grommet according to the eighth or ninth aspect, in which an insertion position holding protrusion that restricts movement to the standby position in a state in which the diameter expansion portion has moved to the insertion position is included on at least one of the inner member and the diameter expansion portion.

An eleventh aspect is the grommet according to any one of the seventh to tenth aspects, in which the grommet main body includes an inner member holding portion that holds the inner member in a state of being equipped on the grommet main body.

A twelfth aspect is the grommet according to the eleventh aspect, in which the inner member holding portion is formed into a shape that protrudes along the axial direction of the large diameter portion from another end portion in the axial direction of the large diameter portion, and protrudes toward an outer circumference side at its leading end side, the inner main body portion includes a locked portion that is openably and closably supported by the outer circumference side of the diameter expansion deformation portion, when the inner member is equipped on the grommet main body, in a state in which the locked portion is open, the locked portion is arranged at a position avoiding interference with the inner member holding portion, and when the locked portion is closed with the inner member equipped on the grommet main body, the inner member holding portion retains and locks onto the locked portion.

A thirteenth aspect is the grommet according to any one of the seventh to twelfth aspects, in which the inner main body portion includes: a pressing piece that is extended toward the outer circumference side of the diameter expansion deformation portion and presses the other end portion of the large diameter portion toward the panel; and an interposed portion that is extended from a portion of the outer circumferential portion of the diameter expansion deformation portion, along the outer circumferential portion, and with an interval provided with respect to the outer circumferential portion, and is interposed between the other end portion of the large diameter portion and the pressing piece.

A grommet-equipped wire harness according to a fourteenth aspect includes: the grommet according to any one of the first to thirteenth aspects; and a wire harness inserted through the cylinder portion.

Advantageous Effects of the Invention

According to the first to fourteenth aspects, the grommet main body can be arranged in the attachment hole with a relatively small force, as long as the inner member is in the initial state. Also, if the state of the inner member is changed to the diameter expansion state with the ring-shaped portion arranged on the inner circumferential side of the attachment hole, the ring-shaped portion can elastically perform diameter expansion deformation, and the grommet can be held in the attachment hole with a comparatively large holding force. For this reason, it is possible to minimize the force needed when attaching the grommet to the attachment hole, and to maximize the holding force in the state in which the grommet is attached to the attachment hole.

According to the second aspect, the ring-shaped portion is pressed into the inner circumferential edge portion of the attachment hole by the inner member, whereby it is possible to prevent the grommet from falling out of the attachment hole.

According to the third aspect, the ring-shaped portion is strongly pressed into the inner circumferential portion of the attachment hole at a partial position in the axial direction of the attachment hole. Accordingly, it is possible to improve the water sealing property between the grommet and the attachment hole.

According to the fourth aspect, the ring-shaped portion elastically deforms so as to significantly protrude due to the inner member-side locking protrusion, and this portion locks onto the circumferential edge portion of the attachment hole from the one surface side of the panel. Accordingly, the grommet can be held in the attachment hole.

According to the fifth aspect, the grommet main body-side locking protrusion locks onto the circumferential edge portion of the attachment hole from the other surface side of the panel, and thus it is possible to suppress the grommet from falling out of the attachment hole.

According to the sixth aspect, the task of attaching the grommet can be performed easily since the temporary locking protrusion temporarily locks onto the circumferential edge portion of the attachment hole from the one surface side of the panel before the state of the inner member-side locking protrusion is changed to the diameter expansion state.

According to the seventh aspect, by inserting the diameter expansion portion into the diameter expansion deformation portion, it is possible to keep the diameter expansion portion in the diameter expansion state.

According to the eighth aspect, the diameter expansion portion can easily be inserted to the insertion position from the standby position.

According to the ninth aspect, a task of fitting the grommet into the attachment hole or the like can be performed in a state in which the inner main body portion and the diameter expansion portion are integrated.

According to the tenth aspect, the state in which the diameter expansion deformation portion has expanded the diameter is reliably maintained.

According to the eleventh aspect, the grommet main body and the inner member can be handled in an integrated state, and therefore fitting into the attachment hole and the like can be performed easily.

According to the twelfth aspect, when the inner member is to be equipped on the grommet main body, the locked portion is arranged at a position avoiding interference with the inner member holding portion when the locked portion is open, and therefore the inner member can easily be equipped on the grommet main body. Also, if the locked portion is closed in the state in which the inner member is equipped on the grommet main body, the inner member holding portion retains and locks onto the locked portion, and the inner member is kept in the state of being equipped on the grommet main body.

According to the thirteenth aspect, the other end portion of the large diameter portion is pressed to the panel by the pressing piece, whereby the grommet can be more reliably held in the attachment hole. When the diameter expansion deformation portion performs diameter expansion, the pressing piece moves relative to the large diameter portion, but the interposed portion is interposed between the other end portion of the large diameter portion and the pressing piece. For this reason, the pressing piece does not move while in contact with the diameter expansion portion, but moves while in contact with the interposed portion. For this reason, when the diameter expansion deformation portion performs diameter expansion, the pressing piece is less likely to hinder the diameter expansion, and the diameter of the diameter expansion deformation portion can be expanded easily. Note that the interposed portion itself is extended from part of the outer circumferential portion of the inner main body portion, along the outer circumferential portion, and with an interval provided with respect to the outer circumferential portion, and therefore the operation of the inner main body portion and the operation of the interposed portion can be separated. For this reason, contact between the interposed portion and the large diameter portion is not likely to hinder the diameter expansion of the diameter expansion deformation portion.

DESCRIPTION OF EMBODIMENTS

Hereinafter, a grommet and a wire harness with a grommet according to an embodiment will be described.

Overall Configuration of Grommet-equipped Wire Harness

Figure 1:
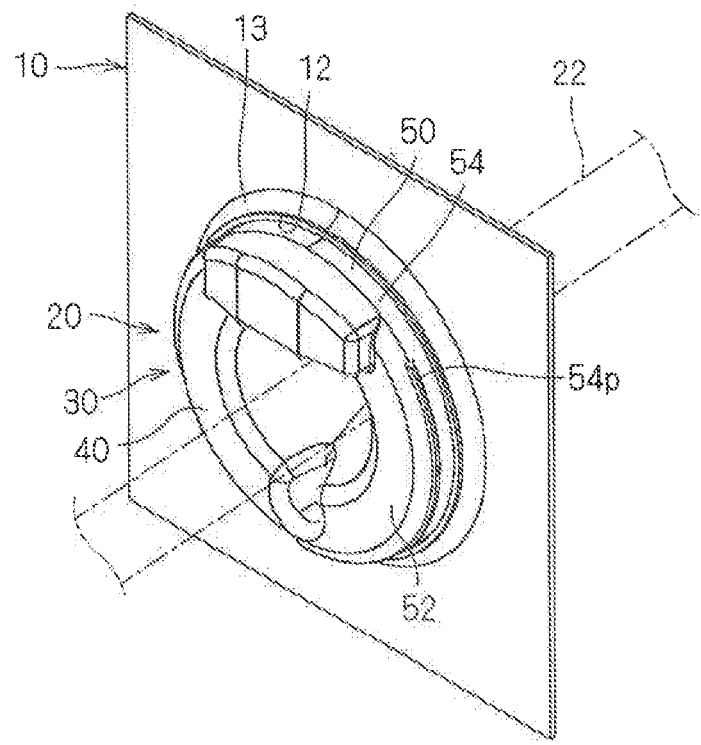
FIG. 1 is a schematic view showing a state in which a grommet-equipped wire harness is attached to a panel.
Figure 2:
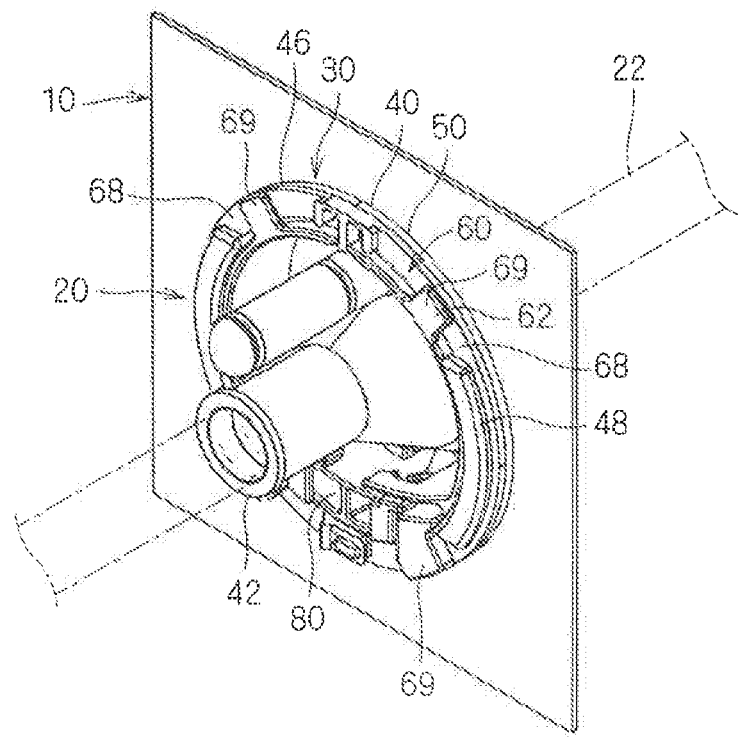
FIG. 2 is a schematic view showing a state in which a grommet-equipped wire harness is attached to a panel.
Figure 3:
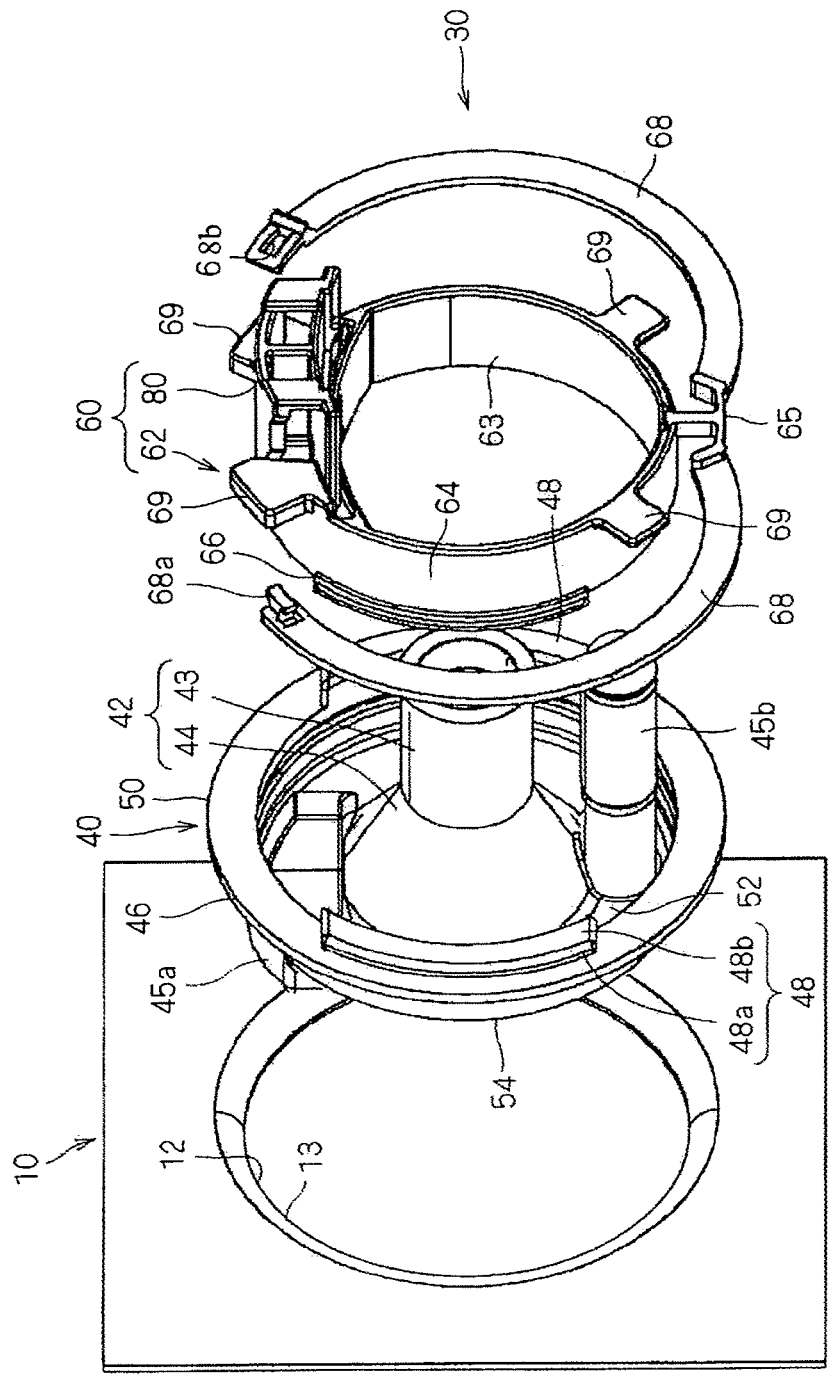
FIG. 3 is an exploded perspective view of a grommet.
Figure 4:
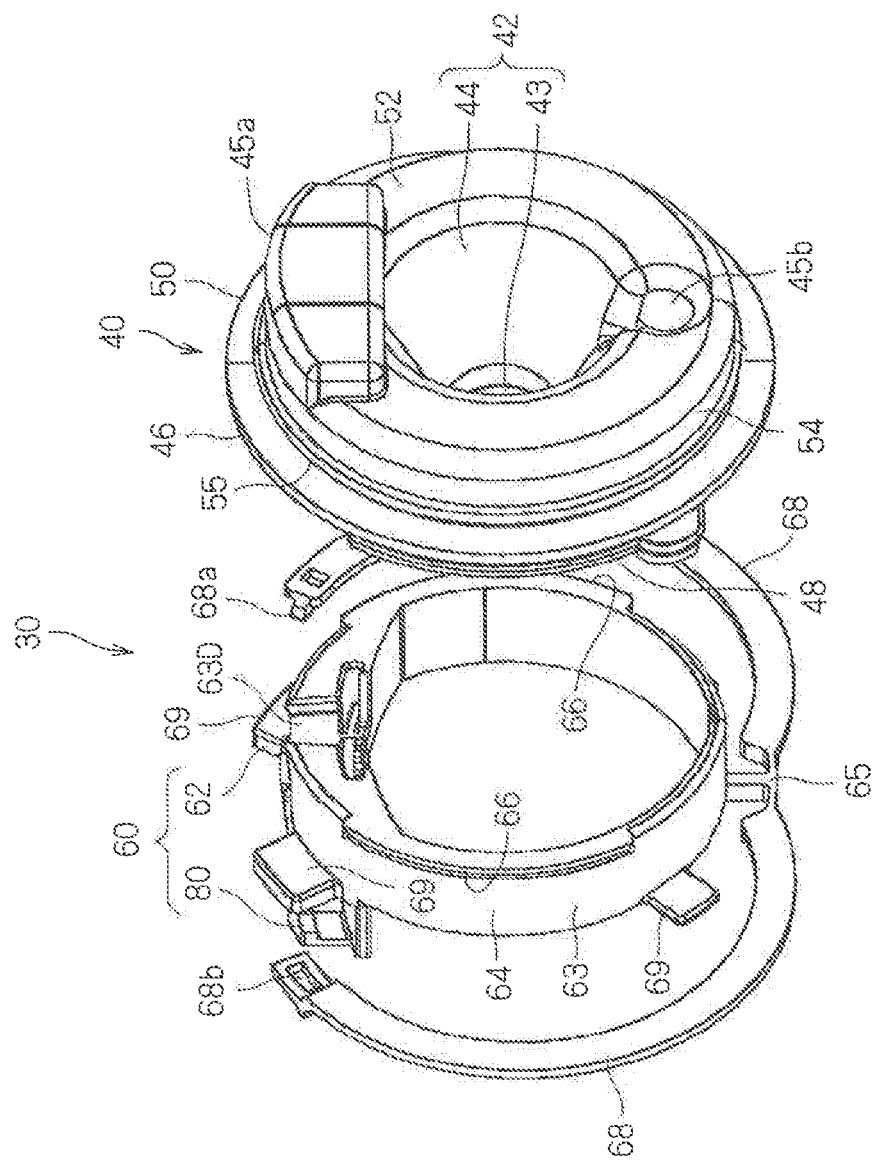
FIG. 4 is an exploded perspective view of a grommet.

FIGS. 1 and 2 are perspective views showing a state in which a grommet-equipped wire harness 20 is attached to a panel 10, and FIGS. 3 and 4 are exploded perspective views of a grommet 30. The panel 10 is also shown in FIG. 3.

The grommet-equipped wire harness 20 is attached to an attachment hole 12 formed in the panel 10.

The panel 10 is a metal panel or the like in a vehicle body of an automobile. For example, the panel 10 partitions the engine room and the vehicle interior in the vehicle. The attachment hole 12 is formed in the panel 10. Here, the attachment hole 12 is circular, but otherwise may be elliptical, polygonal, or the like. The grommet 30 is formed into an outer circumferential shape corresponding to the shape of the attachment hole 12. The inner circumferential edge portion 13 of the attachment hole 12 protrudes in a ring shape from one surface side of the panel 10. Here, the inner circumferential edge portion 13 is upright while curving with respect to the panel 10. Processing for causing the inner circumferential edge portion 13 of the attachment hole 12 to stand upright in this manner is called "burring". However, it is not essential that the inner circumferential edge portion 13 of the attachment hole 12 is subjected to burring.

The grommet-equipped wire harness 20 includes the wire harness 22 and the grommet 30.

The wire harness 22 includes multiple wires that are bundled together. The wire harness 22 is used as a wire that electrically connects electrical devices in two spaces segmented by the panel 10 due to the wire harness 22 being arranged through the attachment hole 12.

The grommet 30 includes a grommet main body 40 and an inner member 60. The grommet main body 40 is a member that is made of an elastic material such as rubber, and includes a cylinder portion 42 and a large diameter portion 50. Also, the grommet main body 40 is fit inside of the attachment hole 12 in a state in which the wire harness 22 is inserted through and held in the cylinder portion 42.

The inner member 60 is fit into the attachment hole 12 along with the grommet main body 40 in a state of being equipped on the grommet main body 40. In this state, the inner member 60 causes a ring-shaped portion 54 of the large diameter portion 50 to perform diameter expansion deformation. Accordingly, the grommet main body 40 is held in a state of being attached to the attachment hole 12. When the grommet main body 40 is to be fit into the attachment hole 12, the grommet main body 40 does not perform diameter expansion deformation, and therefore it can be fit into the attachment hole 12 with a relatively low force. Also, in a state in which the grommet main body 40 is fit into the attachment hole 12, the ring-shaped portion 54 of the grommet main body 40 can hold the attachment hole 12 by performing diameter expansion deformation due to the inner member 60.

Hereinafter, the configurations of the portions will be described in more detail.

Grommet Main Body

As shown in FIGS. 1 to 4, the grommet main body 40 is a member formed by an elastic material such as rubber, and includes the cylinder portion 42 and the large diameter portion 50.

The cylinder portion 42 is formed into a cylindrical shape into which the wire harness 22 can be inserted. Here, one end-side portion of the cylinder portion 42 is formed into a cylinder main body portion 43 with which a portion with the same diameter is continuous, and the other end-side portion of the cylinder portion 42 is formed into a tapered portion 44 that sequentially opens toward the other end portion. Also, the wire harness 22 is inserted into the cylinder portion 42 in a state in which the interior of the cylinder portion 42 is elastically widened. In this state, the cylinder portion 42 elastically contracts in diameter to squeeze and hold the wire harness 22. According to need, adhesive tape or the like is wound around the one end portion of the cylinder main body portion 43 and the wire harness 22. It is not essential that the cylinder portion 42 squeezes and holds the wire harness 22.

The large diameter portion 50 is formed so as to extend from the cylinder portion 42 to the outer circumferential side. The ring-shaped portion 54 that can be arranged on the inner circumferential side of the attachment hole 12 is formed on the outer circumferential portion of the large diameter portion 50.

More specifically, the large diameter portion 50 includes a ring-shaped plate portion 52 and the ring-shaped portion 54.

The ring-shaped plate portion 52 is formed into a ring-shaped plate shape that extends toward the outer circumference from the end portion on the large diameter side of the tapered portion 44. A diameter expansion portion containing portion 45a is formed on a portion in the circumferential direction of the ring-shaped plate portion 52. The diameter expansion portion containing portion 45a protrudes to the side opposite to the side to which the ring-shaped portion 54 protrudes, and forms a containing space for containing the leading end portion of a later-described diameter expansion portion 80 on the side of the diameter expansion portion containing portion 45a to which the ring-shaped portion 54 extends. Also, a linear member insertion portion 45b that protrudes in the same direction as the side to which the ring-shaped portion 54 extends is formed on another portion in the circumferential direction of the ring-shaped portion 54. The linear member insertion portion 45b is formed into a cylinder shape with a closed leading end portion. The linear member insertion portion 45b is used when arranging a linear member such as an antenna cable or a washer hose. That is, the leading end portion of the linear member insertion portion 45b is cut off and the linear member is inserted into the linear member insertion portion 45b. In this state, the adhesive tape is wound around the leading end portion of the linear member insertion portion 45b and the linear member. Accordingly, the linear member is inserted through and held in the linear member insertion portion 45b.

Note that the above-described linear member is an element that is provided as needed. For this reason, depending on the installation location of this grommet, the vehicle type, and the like, it is possible that the linear member insertion portion 45b is not used and the leading end portion is left closed.

The ring-shaped portion 54 is a short circular tube-shaped portion that extends from the outer circumferential edge portion of the ring-shaped plate portion 52 in the same direction as the direction in which the cylinder portion 42 extends. In its initial shape, the outer diameter dimension of the ring-shaped portion 54 is the same as or smaller than (slightly smaller than) the inner diameter dimension of the inner circumferential portion 13 of the attachment hole 12. For this reason, in its initial shape, the ring-shaped portion 54 can be fit into the inner circumferential portion 13 with a small force. Of course, the outer diameter dimension of the ring-shaped portion 54 in the initial shape may be slightly larger than the inner diameter dimension of the inner circumferential edge portion 13 of the attachment hole 12, to such an extent that excessive force is not required when fitting the ring-shaped portion 54 into the inner circumferential edge portion 13.

Also, since the ring-shaped portion 54 is formed using an elastic material, it can elastically deform such that the diameter expands due to the inner member 60. The elastic deformation aspect of the ring-shaped portion 54 caused by the inner member 60 will be described later.

Also, a ring-shaped seal portion 55 that is formed so as to protrude in a ring shape is formed on the outer circumferential portion of the ring-shaped portion 54. In the axial direction of the ring-shaped portion 54, the dimension of the ring-shaped seal portion 55 is smaller than the dimension of the inner circumferential edge portion 13 of the attachment hole 12 in the same direction. For this reason, in the state in which the ring-shaped portion 54 has been deformed so as to expand its diameter, the ring-shaped seal portion 55 is pressed into the inner circumferential edge portion 13 of the attachment hole 12 at a partial position in the axial direction of the attachment hole 12. Accordingly, the surface pressure (load per unit surface area) of the ring-shaped seal portion 55 on the inner circumferential edge portion 13 is increased, and the sealing property between the inner circumferential edge portion 13 and the ring-shaped portion 54 improves.

Also, next to the ring-shaped portion 54, the large diameter portion 50 includes a grommet main body-side locking protrusion 46 that significantly protrudes with respect to the ring-shaped portion 54. The grommet main body-side locking protrusion 46 is provided so as to protrude toward the outer circumference side from the end portion on the side of the ring-shaped portion 54 that is opposite to the ring-shaped plate portion 52. In other words, the grommet main body 40 is inserted into the attachment hole 12 with the ring-shaped plate portion 52 side as the head, and the grommet main body-side locking protrusion 46 is provided on the rear end side in the insertion direction with respect to the ring-shaped portion 54. The outer diameter dimension of the grommet main body-side locking protrusion 46 is larger than the inner diameter dimension of the inner circumferential edge portion 13 of the attachment hole 12. Also, when the grommet main body 40 is inserted into the attachment hole 12, the grommet main body-side locking protrusion 46 comes into contact with the circumferential edge portion of the attachment hole 12 from the other surface side (here, the side opposite to the extension direction of the inner circumferential edge portion 13) of the panel 10. Accordingly, a case is restricted in which the grommet main body 40 moves frontward (to the one surface side of the panel 10) in the insertion direction with respect to the grommet main body 40.

Also, the inner member holding portion 48 that holds the inner member 60 in a state of being equipped on the grommet main body 40 is provided so as to protrude from the other end portion in the axial direction of the large diameter portion 50. Here, a pair of inner member holding portions 48 are provided in a protruding manner on both side portions of the outward-facing end portion of the grommet main body-side locking protrusion 46. The inner member holding portion 48 is formed into a shape that includes an arc-shaped protruding portion 48a that protrudes in the axial direction of the large diameter portion 50, and an arc-shaped locking portion 48b that protrudes toward the outer circumference side on the leading end side of the arc-shaped protruding portion 48a. Also, the inner member 60 is held in a state of being equipped on the grommet main body 40 due to the arc-shaped locking portions 48b locking onto the locked portions 68. The details will be described later.

Inner Member

As shown in FIGS. 1 to 4, the inner member 60 is arranged on the inside of the ring-shaped portion 54 and can change its state from the initial state to the diameter expansion state. When the inner member 60 is in the initial state, the ring-shaped portion 54 of the grommet main body 40 maintains the initial state in which the outer diameter dimension is relatively small. For this reason, the grommet main body 40 can be inserted into the attachment hole 12 with a relatively small force. When the inner member 60 is in the diameter expansion state, at least a portion of the ring-shaped portion 54 of the grommet main body 40 elastically deforms for diameter expansion. Accordingly, the grommet main body 40 is held at the inner circumferential edge portion 13 of the attachment hole 12. There are two configurations for holding the grommet main body 40 at the inner circumferential edge portion 13 of the attachment hole 12. The first is a configuration in which the ring-shaped portion 54 is elastically deformed such that the inner member 60 presses the ring-shaped portion 54 to the inner circumferential edge portion 13 of the attachment hole 12 in the diameter expansion state. In this case, the grommet main body 40 is held in the inner circumferential edge portion 13 mainly by the frictional force between the ring-shaped portion 54 and the inner circumferential edge portion 13. The second is a configuration in which the inner member 60 elastically deforms the ring-shaped portion 54 such that the ring-shaped portion 54 locks onto the circumferential edge portion of the attachment hole 12 from the one surface side of the panel 10 in the diameter expansion state. In this case, the portion of the ring-shaped portion 54 that elastically deforms so as to significantly protrude comes into contact with the circumferential edge portion of the attachment hole 12 from the one surface side of the panel 10, whereby movement of the grommet main body 40 to the other surface side of the panel 10 is restricted.

The inner member 60 includes an inner main body portion 62 and a diameter expansion portion 80. The inner main body portion 62 is a member that is made of a resin that is harder than the grommet main body 40, such as polypropylene, and the inner main body portion 62 is formed into a C-shaped member with one end portion in the circumferential direction on which a divided portion 63D is formed. Here, "C-shaped" means being a ring shape in which a portion in the circumferential direction is divided. Accordingly, the inner main body portion 62 may be formed into an elliptical shape or the like in which a portion in the circumferential direction is divided. The diameter expansion portion 80 is a member made of resin or the like and can be inserted into the divided portion 63D. Also, when the diameter expansion portion 80 is inserted into the divided portion 63D, the inner main body portion 62 performs diameter expansion deformation so as to more widely open the divided portion 63D. Due to the diameter expansion portion 80 being held while inserted in the divided portion 63D, the inner main body portion 62 is kept in the diameter expansion state.

More specifically, the inner main body portion 62 includes a diameter expansion deformation portion 63 that includes a pressing portion 64 and an inner member-side locking protrusion 66.

The pressing portion 64 is formed into a C-shaped cylinder in which a portion of the outer circumference of the short circular tube shape has been cut off. The outer diameter dimension of the pressing portion 64 in the initial state is set to be the same as or smaller than (slightly smaller than) the inner diameter dimension of the ring-shaped portion 54. Also, the outer diameter dimension of the pressing portion 64 in the diameter expansion state is set to be larger than the outer diameter dimension of the pressing portion 64 in the initial state and larger than the inner diameter dimension of the ring-shaped portion 54.

Also, by changing the state of the pressing portion 64 to the diameter expansion state in which the outer diameter dimension is larger, the ring-shaped portion 54 elastically deforms to a state of having a larger outer diameter dimension. Accordingly, the ring-shaped portion 54 is held with respect to the attachment hole 12. At this time, the ring-shaped seal portion 55 is formed on the portion of the ring-shaped portion 54 that is arranged inside of the inner circumferential edge portion 13 of the attachment hole 12. For this reason, mainly the ring-shaped seal portion 55 is pressed into the inner circumferential edge portion 13 with a relatively high surface pressure. Note that the outer diameter dimension of the pressing portion 64 in the initial state may be set larger (slightly larger) than the outer shape dimension of the ring-shaped portion 54, such that the inner member 60 can be fit into the ring-shaped portion 54 with a relatively small force.

The inner member-side locking protrusion 66 is formed so as to extend outward from the one end portion of the pressing portion 64. The position at which the inner member-side locking protrusion 66 is formed is a position of being arranged outward of the one surface side of the panel 10 with respect to the inner circumferential edge portion 13 in a state in which the grommet main body 40 is attached to the attachment hole 12. Here, a pair of inner member-side locking protrusions 66 are formed so as to protrude to both side portions of the pressing portion 64. The inner member-side locking protrusions 66 are formed so as to overhang in the form of arcs from the outer circumferential portion of the pressing portion 64. The inner member-side locking protrusion may be provided on the entirety or a portion of the outer circumference of the diameter expansion deformation portion 63. The inner member-side locking protrusions 66 may come into sliding contact with the inner circumferential surface of the ring-shaped portion 54 when the pressing portion 64 is fit into the ring-shaped portion 54.

Also, by changing the state of the pressing portion 64 to the diameter expansion state in which the outer diameter dimension is larger, the inner member-side locking protrusions 66 are also displaced to the outer circumference side. Accordingly, the inner member-side locking protrusions 66 are elastically deformed such that a portion of the ring-shaped portion 54, or here, a portion (portion near the front in the insertion direction) 54p that is arranged outward on the one surface of the panel 10 with respect to the inner circumferential edge portion 13 protrudes to the outer circumference side. Upon doing so, the portion 54p of the ring-shaped portion 54, which is elastically deformed by the inner member-side locking protrusion 66, locks onto the inner circumferential edge portion 13 of the attachment hole 12 from the one surface side of the panel 10. Accordingly, the grommet main body 40 is restricted from moving to the other surface side of the panel 10.

In the present embodiment, the grommet main body-side locking protrusion 46 comes into contact with the circumferential edge portion of the attachment hole 12 from the other surface side of the panel 10. Also, the above-described portion 54p comes into contact with the circumferential edge portion of the attachment hole 12 from the one surface side of the panel 10. For this reason, a state is entered in which the circumferential edge portion of the attachment hole 12 is interposed between the grommet main body-side locking protrusion 46 and the portion 54p, whereby the grommet main body 40 is held in the attachment hole 12.

Note that the grommet main body-side locking protrusion 46 may be omitted, and the portion of the ring shape that is arranged outward on the other surface side of the panel may be caused to protrude with respect to the inner circumferential edge portion of the attachment hole using the inner member.

The pressing piece 69 that presses the grommet main body-side locking protrusion 46, which is the other end portion of the large diameter portion 50, to the panel 10 is formed on the diameter expansion deformation portion 63. Here, multiple (four herein) pressing pieces 69 are formed so as to protrude from the outer circumference portion of the other end portion of the diameter expansion deformation portion 63. With the pressing pieces 69, the grommet main body-side locking protrusion 46 is pressed to the other surface side of the panel 10 at the circumferential edge portion of the attachment hole 12.

Also, locked portions 68 are provided on the diameter expansion deformation portion 63. The locked portions 68 are supported so as to be able to open and close on the outer circumference side of the diameter expansion deformation portion 63. More specifically, a pair of locked portions 68 in the form of semi-circular arc plates are provided on the diameter expansion deformation portion 63. The base end portions of the pair of locked portions 68 are openably and closably coupled to the leading end portion of the protruding support portion 65 that extends outward from the outer circumferential portion on the side of the diameter expansion deformation portion 63 that is opposite to the divided portion 63D. The position at which the pressing portion 64 is supported is a position on the grommet main body-side locking protrusion 46 side with respect to the pressing pieces 69. The radius of curvature of the locked portion 68 is set larger than the radius of curvature of the outer circumferential surface of the pressing portion 64. Also, a locking protrusion 68a is formed on the leading end portion of one of the locked portions 68, and a locked hole portion 68b is provided at the leading end portion of the other locked portion 68.

Also, when the pair of locked portions 68 are opened, the pair of locked portions 68 are arranged separated in the outer circumferential side of the pressing portion 64 (see FIGS. 3 and 4). Accordingly, when the inner member 60 is equipped inside of the grommet main body 40, the locked portions 68 are arranged at positions avoiding interference with the arc-shaped locking portions 48b of the inner member holding portions 48.

Also, if the pair of locked portions 68 are closed and the locking protrusion 68a locks onto the locked hole portion 68b, the pair of locked portions 68 are continuous in the form of a ring at a position separated by an interval from the outer circumferential portion of the pressing portion 64. In this state, the arc-shaped protruding portions 48a of the inner member holding portions 48 are arranged between the pressing portion 64 and the pair of locked portions 68, the arc-shaped locking portions 48b are arranged on the outer surface sides of the pair of locked portions 68, and the arc-shaped locking portions 48b lock onto the pair of locked portions 68 of the inner member 60 (see FIG. 2). Accordingly, the inner member 60 is held in a state of being equipped on the grommet main body 40.

Also, in the above-described state, the pair of locked portions 68 are extended from part of the circumferential portion of the diameter expansion deformation portion 63, along the outer circumferential portion, and with an interval provided with respect to the outer circumferential portion. Also, the pair of locked portions 68 are used as interposed portions that are interposed between the other end portions (here, the outward-facing surfaces of the grommet main body-side locking protrusions 46) of the large diameter portion 50 and the pressing pieces 69.

Also, although the pressing pieces 69 also move to the outside as the diameter expansion deformation portion 63 performs a diameter expansion deformation, at this time, the pressing pieces 69 move while in contact with the pair of locked portions 68. The pressing pieces 69 and the pair of locked portions 68 are made of resin or the like, and therefore the frictional force therebetween is smaller than the frictional force between the grommet main body-side locking protrusion 46, which is made of an elastic material such as rubber, and the pressing piece 69. For this reason, the pressing pieces 69 can move smoothly on the outward-facing surfaces of the pair of locked portions 68 and can cause the diameter expansion deformation portion 63 to smoothly perform diameter expansion deformation. Note that the pair of locked portions 68 are extended from part of the circumferential portion of the diameter expansion deformation portion 63, along the outer circumferential portion, and with an interval provided with respect to the outer circumferential portion, and therefore it is possible to maintain a constant state (here, a constant ring-shaped state) regardless of the diameter expansion deformation of the diameter expansion deformation portion 63, and therefore the frictional force between the pair of locked portions 68 and the grommet main body-side locking protrusion 46 is not likely to hinder the diameter expansion deformation of the diameter expansion deformation portion 63.

The diameter expansion portion 80 is a member that is made of resin or the like and causes the diameter expansion deformation portion 63 to perform diameter expansion deformation by widening the divided portion 63D by being inserted into the divided portion 63D. The two end portions sandwiching the divided portion 63D of the inner member 62 are provided with guiding portions 70 that guide the diameter expansion portion 80 from a standby position of being withdrawn outward from the divided portion 63D to the insertion position of being inserted in the divided portion 63D. Also, the diameter expansion portion 80 is inserted into the divided portion 63D in a state of being guided by the guiding portion 70, and thus the divided portion 63D opens widely and the diameter expansion deformation portion 63 is deformed so as to expand its diameter.

Figure 5:
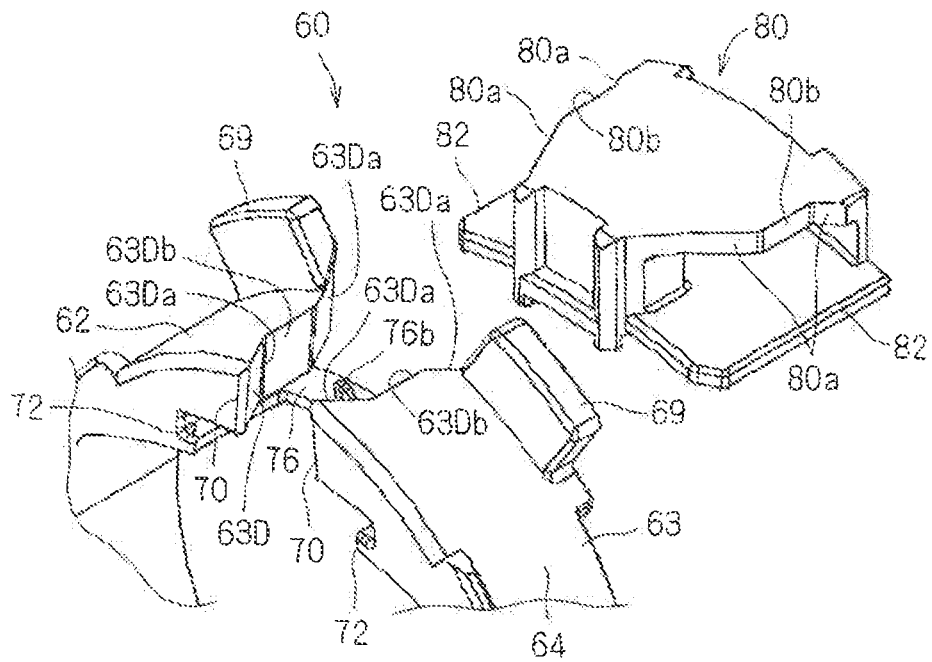
FIG. 5 is an enlarged exploded perspective view of a divided portion and a diameter expansion portion.
Figure 6:
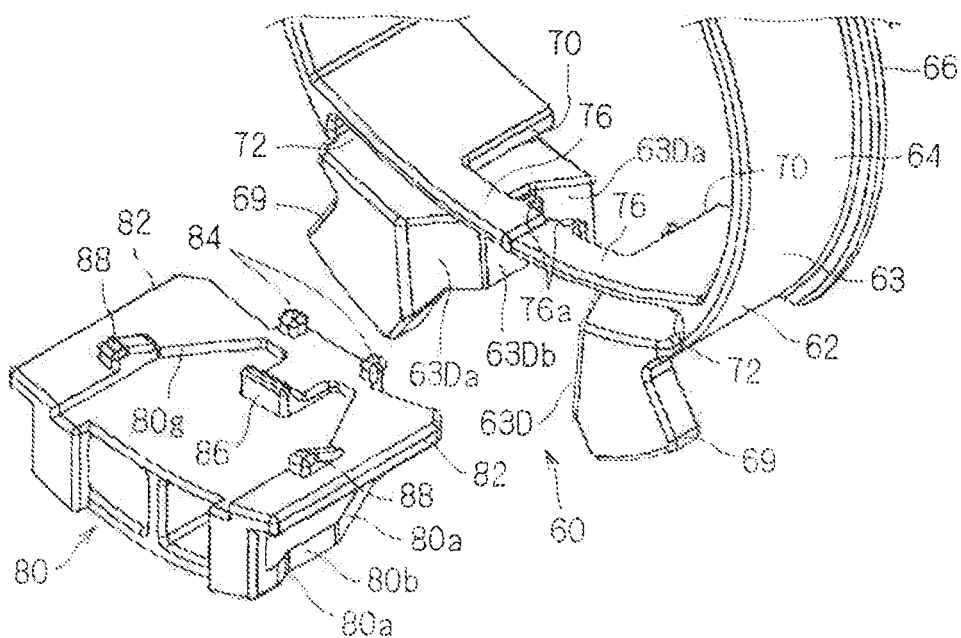
FIG. 6 is an enlarged exploded perspective view of a divided portion and a diameter expansion portion.
Figure 7:
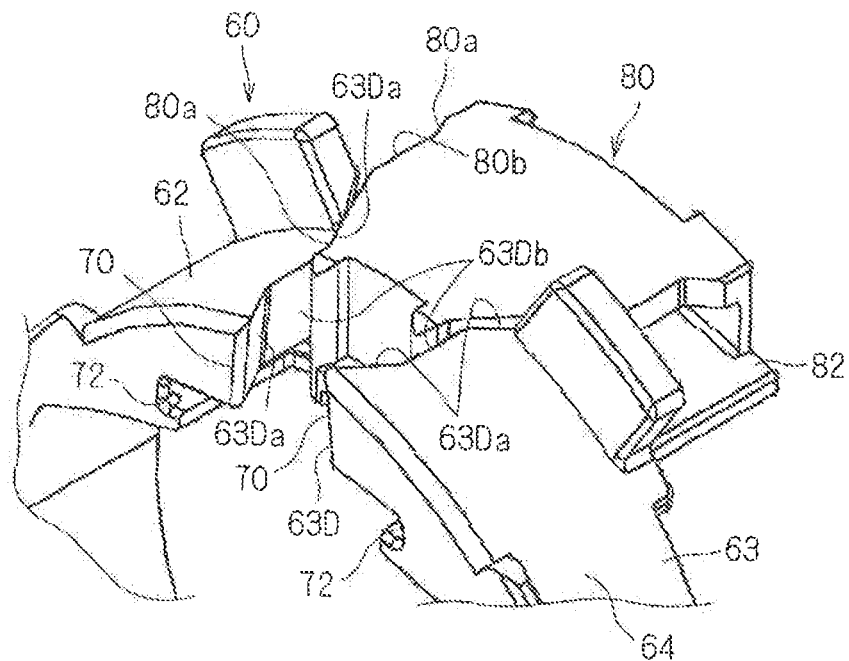
FIG. 7 is an enlarged perspective view showing a state in which a diameter expansion portion is located at a standby position.
Figure 8:
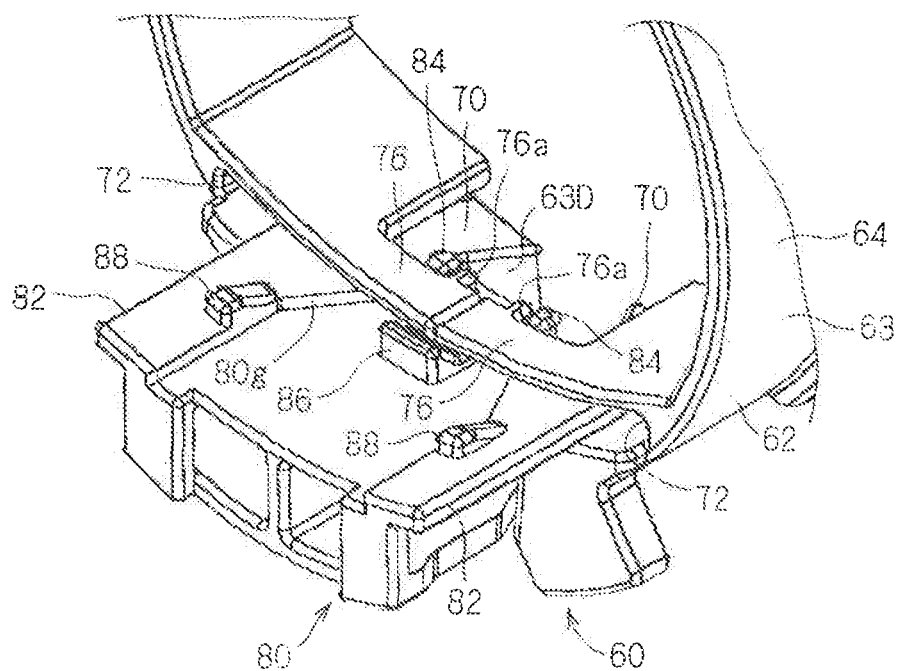
FIG. 8 is an enlarged perspective view showing a state in which a diameter expansion portion is located at a standby position.
Figure 9:
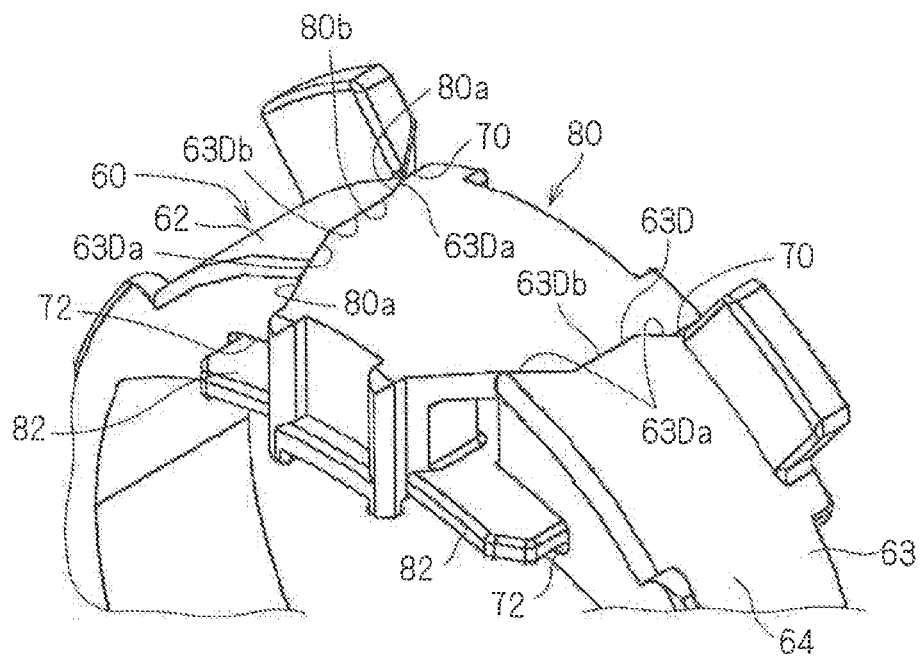
FIG. 9 is an enlarged perspective view showing a state in which a diameter expansion portion is located at an insertion position.
Figure 10:
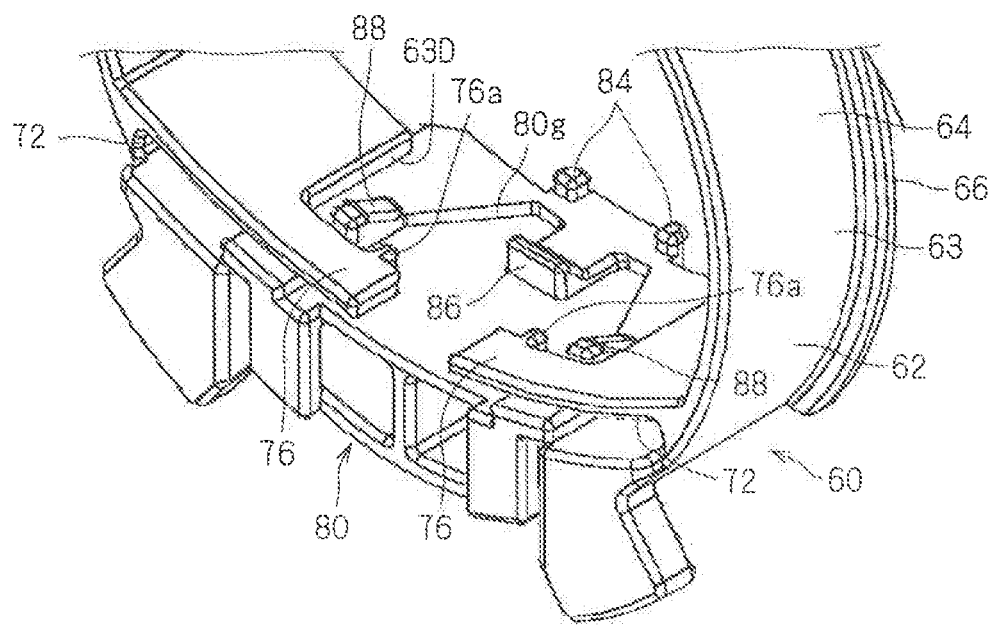
FIG. 10 is an enlarged perspective view showing a state in which a diameter expansion portion is located at an insertion position.

FIGS. 5 and 6 are enlarged exploded perspective views of the divided portion 63D and the diameter expansion portion 80, FIGS. 7 and 8 are enlarged perspective views showing a state in which the diameter expansion portion 80 is located at the standby position, and FIGS. 9 and 10 are enlarged perspective views showing a state in which the diameter expansion portion 80 is located at the insertion position.

First, inclined surfaces 63Da that gradually narrow toward one end in the axial direction of the diameter expansion deformation portion 63 are formed on both end portion-side surfaces of the diameter expansion deformation portion 63 sandwiching the divided portion 63D. Here, on the two end portion-side surfaces of the diameter expansion deformation portion 63 sandwiching the divided portion 63D, planes 63Da are formed on the two end portions in the axial direction of the diameter expansion deformation portions 63, and planes 63Db along the axial direction of the diameter expansion deformation portions 63 are formed at intermediate portions thereof.

On the other hand, inclined surfaces 80a that gradually narrow toward one end (toward the insertion direction) are formed in the axial direction (the insertion direction of the diameter expansion portion 80) of the diameter expansion deformation portion 63 on both side surfaces of the diameter expansion portion 80. Here, the inclined surfaces 80a are formed on both end portions of the two side surfaces of the diameter expansion portion 80 in the axial direction of the diameter expansion deformation portion 63, and planes 80b along the axial direction of the diameter expansion deformation portion 63 are formed at an intermediate portion thereof.

Also, when the diameter expansion portion 80 is inserted between the divided portion 63D, the inclined surface 63Da slides against the inclined surface 80a and the divided portion 63D is gradually widened. Accordingly, the diameter expansion deformation portion 63 gradually performs diameter expansion deformation as the diameter expansion portion 80 is inserted into the divided portion 63D (see FIGS. 7 and 9).

Also, guiding portions 70 are provided on both end portions of the diameter expansion deformation portion 63 that sandwich the divided portion 63D. The guiding portions 70 include guide grooves 72 and guiding plate portions 76.

The guide grooves 72 are formed on both end portions of the diameter expansion deformation portion 63 that sandwich the divided portion 63D, on inner circumference-side portions with respect to the inclined surfaces 63Da. The guide grooves 72 are formed into groove shapes that are open on the divided portion 63D side and on both sides in the axial direction of the diameter expansion deformation portion 63.

The guiding plate portions 76 are formed on both end portions of the diameter expansion deformation portion 63 that sandwich the divided portion 63D, on the inner circumference-side portion with respect to the guide grooves 72. The guiding plate portions 76 are formed into elongated plate shapes that are formed so as to protrude from the positions of the frontward portions in the insertion direction of the diameter expansion portion 80 to the divided portion 63D on the two end portions of the diameter expansion deformation portion 63 that sandwich the divided portion 63D. A diameter expansion restricting protrusion portion 76a that protrudes in the insertion direction of the diameter expansion portion 80 is formed so as to protrude on the leading end portion of the guiding plate portion 76. Also, guide protrusions 76b that protrude toward the outer circumferential side of the diameter expansion deformation portion 63 are provided so as to protrude at positions near the leading ends of the guiding portions 70. The guide protrusions 76b slide against guide surfaces 80g formed on the inward-facing surfaces of the diameter expansion portion 80 accompanying the insertion of the diameter expansion portion 80, and stabilize the orientation of the diameter expansion portion 80.

On the other hand, slide plate portions 82 are formed on the two side surfaces of the diameter expansion portion 80, which are portions located on the inner circumferential side of the diameter expansion deformation portion 63 when the diameter expansion portion 80 is inserted into the divided portion 63D. The slide plate portions 82 are formed into plate shapes that extend outward of the two side surfaces of the diameter expansion portion 80 and along the insertion direction of the diameter expansion portion 80. Due to the slide plate portions 82 being inserted into the guide grooves 72, the diameter expansion portion 80 is guided from the standby position to the insertion position along the insertion direction, which is the axial direction of the diameter expansion deformation portion 63.

The inner circumference-side portion of the diameter expansion portion 80 that faces the inner circumference side of the diameter expansion deformation portion 63 faces the guiding plate portion 76 side. A pair of standby position holding protrusions 84 are formed at the inner circumference-side portions of the diameter expansion portion 80, which are the portions near the front side in the insertion direction of the diameter expansion portion 80. Also, at the standby position at which only the leading end portions of the diameter expansion portion 80 are inserted into the divided portion 63D, each of the pair of standby position holding protrusions 84 come into contact with the edges of the guiding plate portion 76 on the insertion direction side of the diameter expansion portion 80 (see FIG. 8). Accordingly, movement of the diameter expansion portion 80 from the standby position in the falling-out direction (direction opposite to the insertion direction) is restricted. At the same time, the pair of standby position holding protrusions 84 come into contact with diameter expansion restricting portions 76a as well. Accordingly, a case is suppressed in which the diameter expansion deformation portion 63 further expands its diameter due to the divided portion 63D.

Also, a temporary locking protrusion 86 is formed at a position on the inner circumference-side portion of the diameter expansion portion 80 that is on the front side in the insertion direction relative to the pair of standby position holding protrusions 84. The temporary locking protrusion 86 is formed into a shape whose protrusion dimension gradually decreases in the insertion direction of the diameter expansion portion 80. In the state in which the pair of standby position holding protrusions 84 come into contact with the guiding plate portions 76, the inclined surfaces of the temporary locking protrusion 86 are in contact with the guiding plate portions 76 from the side opposite to that of the pair of standby position holding protrusions 84. Accordingly, a case is suppressed in which the diameter expansion portion 80 moves from the standby position toward the insertion position with a light force. Of course, if the diameter expansion portion 80 is inserted with some level of force, the guiding plate portions 76 elastically deform and go past the inclined surface of the temporary locking portion 86, and therefore the diameter expansion portion 80 can move from the standby position to the insertion position.

Also, a pair of insertion position holding protrusions 88 are formed on the two side portions of the inner circumferential surface portions of the diameter expansion portion 80. The forming positions of the insertion position holding protrusions 88 are positions that can come into contact with the guiding plate portions 76 from the far side in the insertion direction, in a state in which the diameter expansion portion 80 is inserted at an insertion position. The insertion position holding protrusions 88 are formed into shapes whose protrusion dimensions gradually decrease in the insertion direction of the diameter expansion portion 80. The surfaces of the insertion position holding protrusions 88 on the near side in the insertion direction of the diameter expansion portion 80 are formed into orthogonal surfaces that are orthogonal to the insertion direction.

Also, when the diameter expansion portion 80 is pressed toward the insertion position, the pair of guiding plate portions 76 come into contact with the inclined surfaces of the pair of insertion position holding protrusions 88, and the pair of guiding plate portions 76 elastically deform and go past the pair of insertion position holding protrusions 88. In this state, the edge portions of the pair of guiding plate portions 76 on the insertion direction side come into contact with the orthogonal surfaces of the pair of insertion position holding protrusions 88 (see FIG. 10). Accordingly, movement of the diameter expansion portion 80 from the insertion position to the standby position is restricted.

Standby position holding protrusions that protrude with respect to the inner main body portion side and lock onto a diameter expansion portion located at the standby position may be provided in addition to or instead of the standby position holding protrusions 84. Also, insertion position holding protrusions that protrude with respect to the inner main body portion side and lock onto the diameter expansion portion located at the insertion position may be provided in addition to or instead of the insertion position holding protrusions 88.

Assembly and Attachment Procedure

A method for assembling the grommet-equipped wire harness 20 and a method for attaching it to the panel 10 will be described.

Figure 11:
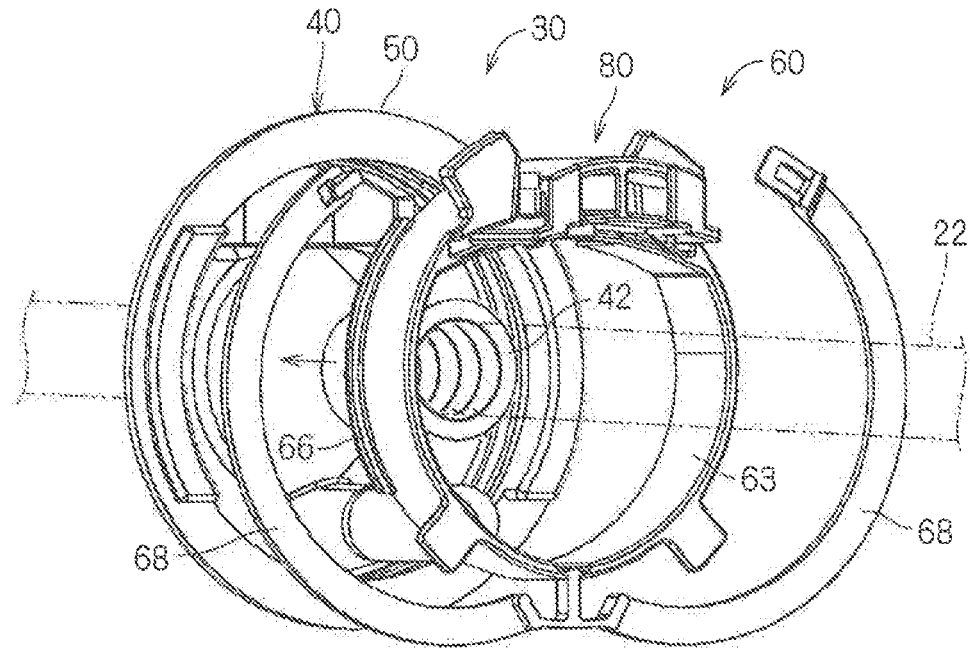
FIG. 11 is an illustrative diagram showing a method of assembling a grommet-equipped wire harness.

First, as shown in FIG. 11, a wire harness 22 that is inserted into and held in the cylinder portion 42 of the grommet main body 40 is prepared. The insertion of the wire harness 22 into the cylinder portion 42 is carried out by widening the cylinder portion 42 with a grommet expansion apparatus or the like, similarly to the insertion of the wire harness into the grommet that is made entirely of rubber or the like. Also, the inner main body portion 62 is arranged on the other end portion side of the grommet main body 40 such that the wire harness 22 extending from the cylinder portion 42 is arranged inside of the inner main body portion 62. Note that the diameter expansion deformation portion 63 of the cylinder portion 42 is divided by the divided portion 63D, the pair of locked portions 68 are opened, and a gap is provided between the leading end portions, and therefore the wire harness 22 can be easily arranged inside of the inner main body portion 62 by passing the wire harness 22 through the divided portion 63D and the gap. Thereafter, the diameter expansion portion 80 is set to the standby position of the divided portion 63D of the inner main body portion 62.

Figure 12:
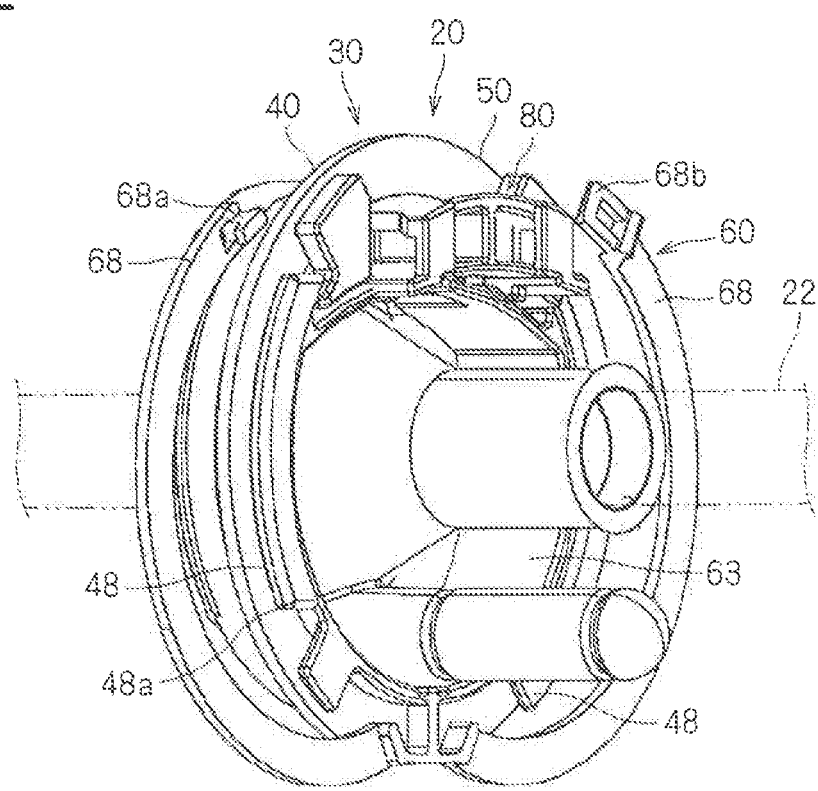
FIG. 12 is an illustrative diagram showing a method of assembling a grommet-equipped wire harness.

Thereafter, as shown in FIG. 12, the diameter expansion deformation portion 63 of the inner main body portion 62 is fit into the ring-shaped portion 54 of the grommet main body 40. At this time, the diameter expansion deformation portion 63 is in a comparatively small diameter state, and therefore the task of fitting into the grommet main body 40 can be performed easily. Also, by opening the pair of locked portions 68, interference between the pair of locked portions 68 and the pair of inner member holding portions 48 is avoided, and the fitting task of the inner main body portion 62 can be performed.

Figure 13:
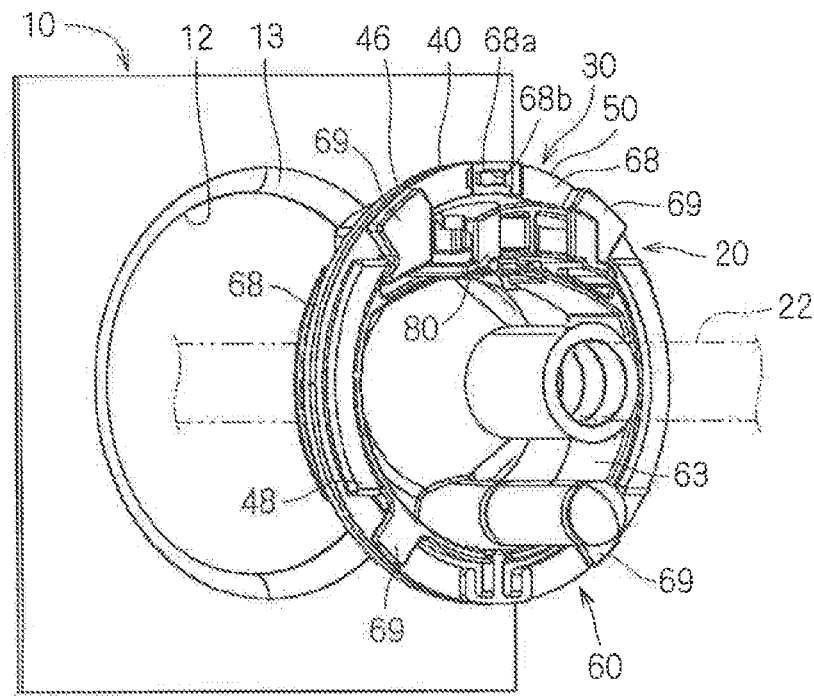
FIG. 13 is an illustrative diagram showing a method of attaching a grommet to a panel.

Thereafter, as shown in FIG. 13, the pair of locked portions 68 are closed and the locking protrusion 68a and the locked hole portion 68b on the leading end portions thereof are locked. Upon doing so, the arc-shaped protruding portion 48a of the inner member holding portion 48 is arranged between the pressing portion 64 and the pair of locked portion 68, the arc-shaped locking portion 48b is arranged on the outer surface side of the pair of locked portions 68, and the arc-shaped locking portion 48b are locked onto the pair of locked portions 68 of the inner member 60. Accordingly, the inner member 60 is held in a state of being equipped on the grommet main body 40. That is, the inner member 60 and the grommet main body 40 can be handled integrally. In this state, the grommet-including wire harness 20 is stored, transported, and the like as needed.

Figure 14:
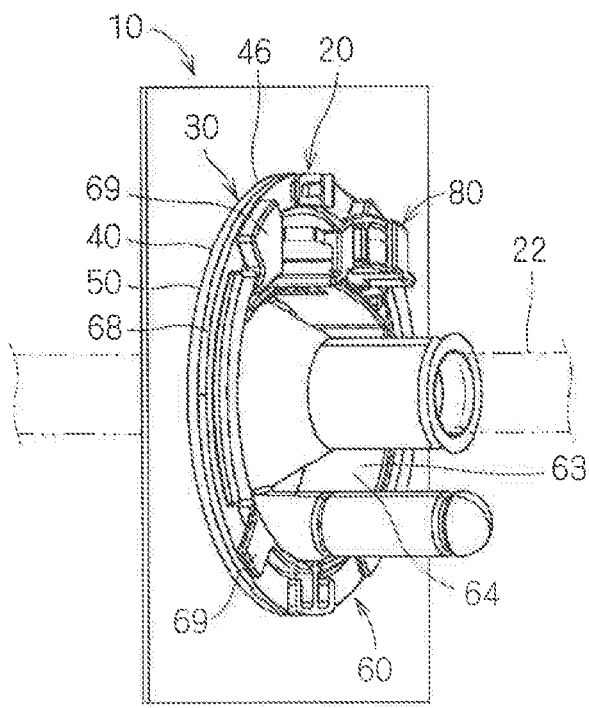
FIG. 14 is an illustrative diagram showing a method of attaching a grommet to a panel.

As shown in FIG. 14, when the grommet-including wire harness 20 is to be attached to the attachment hole 12 of the panel 10, it is fit into the attachment hole 12 with the ring-shaped plate portion 52 side set as the front side. The fitting of the grommet 30 is performed until the grommet main body-side locking protrusion 46 comes into contact with the other surface side of the panel 10.

Figure 15:
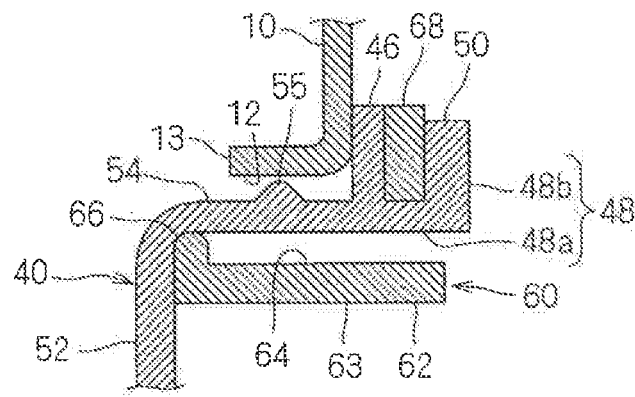
FIG. 15 is an overall cross-sectional view showing a state of a grommet and an inner circumferential edge portion of an attachment hole.

In this state, the diameter expansion portion 80 is at a standby position, and therefore the diameter expansion deformation portion 63 is kept in the initial state with a comparatively small outer diameter dimension. For this reason, as shown in FIG. 15, the fitting of the grommet 30 is performed in a state in which the ring-shaped portion 54 and the inner circumferential edge portion 13 of the attachment hole 12 are not in contact or are lightly in contact.

Accordingly, the force that is needed when fitting the grommet 30 into the attachment hole 12 is comparatively small.

Figure 16:
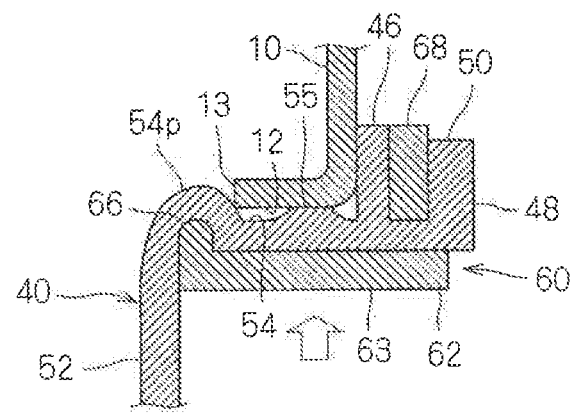
FIG. 16 is an overall cross-sectional view showing a state of a grommet and an inner circumferential edge portion of an attachment hole.

Thereafter, the diameter expansion portion 80 is pressed and moved from the standby position to the insertion position. Upon doing so, the divided portion 63D is widened through sliding contact between the inclined surfaces 63Da and the inclined surfaces 80a, and the diameter expansion deformation portion 63 changes to a diameter expansion state of having a larger outer diameter dimension. Upon doing so, as shown in FIG. 16, the ring-shaped portion 54 is pressed to the inner circumferential edge portion 13 of the attachment hole 12 and the ring-shaped seal portion 55 formed in the ring-shaped portion 54 is pressed to the inner circumferential edge portion. Accordingly, the grommet main body 40 is held in the inner circumferential edge portion 13 by the frictional force between the ring-shaped portion 54 and the inner circumferential edge portion 13. Also, the inner member-side locking protrusions 66 elastically deform the portion 54p of the ring-shaped portion 54 such that it protrudes to the outer circumference side, and the portion 54p locks onto the inner circumferential edge portion 13 of the attachment hole 12 from the one surface side of the panel 10. Accordingly, the grommet main body 40 is restricted from moving to the other surface side of the panel 10. Note that movement in the opposite direction is restricted due to the grommet main body-side locking protrusion 46 coming into contact with the circumferential edge portion of the inner circumferential edge portion 13 from the other surface side of the panel 10.

Also, when the diameter expansion portion 80 causes the diameter expansion deformation portion 63 to perform a diameter expansion deformation, the pressing pieces 69 are also displaced to the outer circumference side. A pair of locked portions 68 serving as interposed portions are provided between the pressing pieces 69 and the grommet main body-side locking protrusion 46, and therefore the pressing pieces 69 can be displaced to the outer circumference side while sliding relatively smoothly on the pair of locked portions 68. For this reason, the diameter expansion deformation portion 63 can smoothly perform diameter expansion deformation, and the diameter expansion portion 80 can be moved to the insertion position with a relatively small force.

Effects and the Like

With the above-configured grommet 30 and grommet-including wire harness 20, the grommet main body 40 can be arranged by being fit into the attachment hole 12 with a comparatively small force if the inner member 60 is in the initial state. Also, when the ring-shaped portion 54 is arranged on the inner circumference side of the attachment hole 12, if the state of the inner member 60 is changed to the diameter expansion state, the ring-shaped portion 54 can elastically perform diameter expansion deformation to hold the grommet 30 in the attachment hole 12 with a comparatively large force. For this reason, it is possible to minimize the force needed when attaching the grommet 30 to the attachment hole 12, and to maximize the holding force when the grommet 30 is attached to the attachment hole 12.

Also, since the above-described holding structure is used, the holding force on the attachment hole 12 can be obtained without making the portion of the grommet 30 on the front side in the insertion direction thick. For this reason, it is possible to make the grommet 30 thin, and as a result, the grommet 30 can be deformed easily when the wire harness 22 is attached to the grommet 30. For this reason, the attachment of the wire harness 22 to the grommet 30 can be performed easily. Also, since it is possible to make the grommet 30 thin, the cylinder portion 42 can easily change orientation with respect to the ring-shaped portion 54 held in the inner circumferential edge portion 13 of the attachment hole 12. As a result, even if the wire harness 22 is suddenly curved near the grommet 30, mainly the cylinder portion 42 can be made to follow the curving by changing its orientation, with the state in which the ring-shaped portion 54 is attached to the inner circumferential edge portion 13 kept favorable, and the sealability can be kept favorable.

Also, since the grommet 30 can be fit into the attachment hole 12 with a comparatively small force, if the grommet 30 needs to be inserted into the attachment hole from an oblique direction with respect to the panel 10 due to the condition of the layout of the peripheral components in the vehicle or the like, or if space for a wide fitting task cannot be ensured, or the like, the fitting task can be performed easily by fitting the grommet 30 into the attachment hole 12 by directly pressing or the like.

Also, with the conventional grommet that is entirely made of rubber, a large fitting force is applied to the grommet, and therefore the fitting task is carried out while holding the wire harness. In this case, it is necessary to ensure as wide a work space as possible in front of and behind the grommet 30. Also, the grommet stretches and the wire harness needs to be pressed with a large stroke. Also, upon being fixed to the wire harness vehicle in front of and behind the grommet, it is difficult to press with the needed stroke. With the present grommet 30, the grommet 30 can be fit into the attachment hole 12 with a relatively small force, and therefore the above-described problem is not likely to occur and the task of fitting the grommet 30 can be carried out easily.

Also, the holding force is obtained by the inner member 60 made of resin with a higher rigidity than the grommet main body 40, which is made of rubber or the like, and therefore the holding force can be increased as much as possible.

More specifically, the grommet 30 is held in the attachment hole 12 by pressing the ring-shaped portion 54 into the inner circumferential edge portion 13 of the attachment hole 12 using the inner member 60.

At this time, the ring-shaped seal portion 55 of the ring-shaped portion 54 is strongly pressed onto the inner circumferential edge portion 13 of the attachment hole 12 at a partial position in the axial direction of the attachment hole 12. Accordingly, it is possible to increase the water sealing property between the grommet 30 and the attachment hole 12.

The ring-shaped portion 54 elastically deforms so as to strongly protrude due to the inner member-side locking protrusion 66, and the portion 54p locks onto the circumferential edge portion of the attachment hole 12 from the one surface side of the panel 10, whereby the grommet 30 is held in the attachment hole 12.

On the near side in the insertion direction of the grommet 30, the grommet main body-side locking protrusion 46 locks onto the circumferential edge portion of the attachment hole 12 from the other surface side of the panel 10, whereby it is possible to suppress the grommet 30 from falling out of the attachment hole 12.

Regarding the inner member 60, the diameter expansion portion 80 is inserted into the diameter expansion deformation portion 63, whereby the inner member 60 can easily be kept in the state in which the diameter expansion deformation portion 63 has an expanded diameter.

Since the guiding portions 70 are provided on the diameter expansion deformation portion 63, the diameter expansion portion 80 can easily be inserted from the standby position to the insertion position.

The diameter expansion portion 80 is held at the standby position, and therefore the task of fitting the grommet 30 into the attachment hole 12 and the like can be carried out in a state in which the inner main body portion 62 and the diameter expansion portion 80 are integrated.

When the diameter expansion portion 80 is inserted to the insertion position, it is held at the insertion position, and therefore the state in which the diameter expansion deformation portion 63 has an expanded diameter is reliably maintained.

Due to the inner member holding portion 48, the grommet main body 40 and the inner member 60 can be handled in an integrated state, and therefore the task of fitting the grommet 30 into the attachment hole 12 and the like can be performed easily.

The pair of locked portions 68 can open and close, and in the state in which the pair of locked portions 68 are open, the pair of locked portions 68 are arranged at positions avoiding interference with the pair of inner member holding portion 48. For this reason, the task of equipping the inner member 60 on the grommet main body 40 can be performed easily. Then, if the pair of locked portions 68 are closed while the inner member 60 is equipped on the grommet main body 40, the pair of inner member holding portions 48 can lock onto the pair of locked portions 68 and can be held in the state in which the inner member 60 is equipped on the grommet main body 40.

Since the grommet main body-side locking protrusion 46 of the other end portion of the large diameter portion 50 is pressed toward the panel 10 by the pressing pieces 69, it is possible more reliably hold the grommet 30 in the attachment hole 12. If the pressing pieces 69 are provided on the diameter expansion deformation portion 63, the pressing pieces 69 also are displaced to the outer circumference side when the diameter expansion deformation portion 63 performs diameter expansion. At this time, the pair of locked portions 68 serving as interposed portions are provided between the pressing piece 69 and the grommet main body-side locking protrusion 46, and therefore the pressing pieces 69 can easily be displaced while sliding on the pair of locked portions 68. For this reason, the task of expanding the diameter of the diameter expansion deformation portion 63 can be carried out easily.

Modified Examples

In the above-described embodiment, a configuration in which the ring-shaped portion 54 is pressed to the inner circumferential edge portion 13 of the attachment hole 12 by the inner member 60 and a configuration in which the ring-shaped portion 54 is elastically deformed so as to protrude significantly by the inner member-side locking protrusion 66 and the portion 54p is locked onto the circumferential edge portion of the attachment hole 12 from the one surface side of the panel 10 were both employed, but it is also possible to employ only one of the two configurations.

Figure 17:
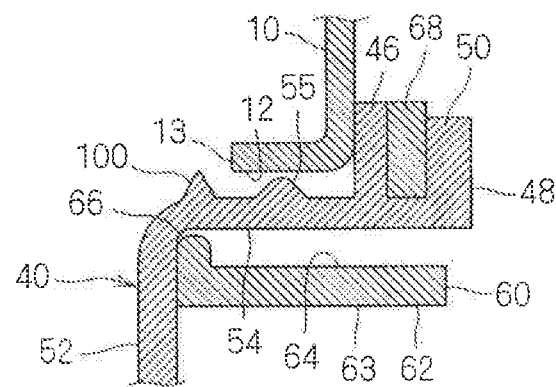
FIG. 17 is an overall cross-sectional view showing a grommet according to a modified example.

Also, as shown in FIG. 17, in a state before elastic deformation, the temporary locking protrusion 100 that locks onto the circumferential edge portion of the attachment hole 12 from the one surface side of the panel 10 may be formed at the portion of the ring-shaped portion 54 that is elastically deformed by the inner member-side locking protrusion 66. The temporary locking protrusion 100 may be provided in a ring shape spanning over the entirety of the outer circumferential direction of the ring-shaped portion 54, or it may be partially provided. Accordingly, in the state before the diameter expansion deformation portion 63 performs diameter expansion deformation, the grommet main body 40 can be made less likely to fall out of the attachment hole 12, and the task of attaching the grommet 30 including the diameter expansion task of the diameter expansion deformation portion 63 can be carried out easily.

Also, the pair of locked portions 68 were used as members locked by the inner member holding portion 48 and members interposed between pressing pieces 69 and the grommet main body 40, but it is also possible to use a configuration in which the inner member holding portion 48 is omitted, or the pressing pieces 69 are omitted, and thus only one of the above-described roles is fulfilled.

Figure 18:
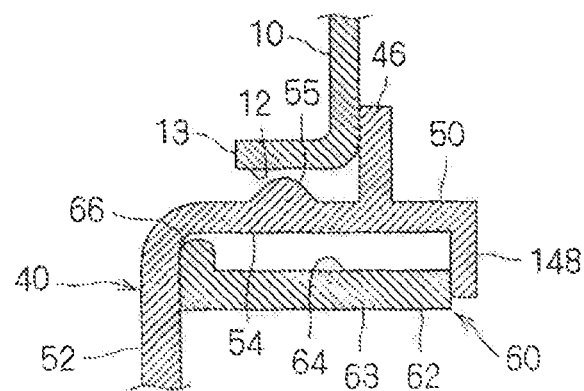
FIG. 18 is an overall cross-sectional view showing a grommet according to another modified example.

Also, as shown in FIG. 18, it is also possible to use a configuration in which an inner member holding portion 148 that extends inward from the other side end portion of the grommet main body 40 is formed instead of the inner member holding portion 48 and an inner member holding portion 148 holds the diameter expansion deformation portion 63 such that it is suppressed inside of the grommet main body 40. Also, the pair of locked portions 68 may be omitted.

Also, in the above-described embodiment, an example was described in which the diameter expansion deformation portion 63 is a member formed into a C shape, but it is also possible to use a configuration in which the diameter expansion deformation portion has a C shape due to a semicircular arc-shaped member being coupled thereto via a hinge portion. The hinge portion may have a configuration in which part of the resin is made thinner and easy to deform, or it may have a configuration in which separately molded components are coupled and supported using a structure in which the shaft portions and the bearing recesses are fit.

Note that the configurations described in the embodiment and modified examples above can be combined as appropriate, as long as no discrepancies occur.

Although the invention was described in detail above, the description above is in all aspects exemplary, and the invention is not limited thereto. It is to be understood that countless variations that have not been illustrated can be envisioned without departing from the scope of the invention.

LIST OF REFERENCE NUMERALS

10 Panel
12 Attachment hole
13 Inner circumferential edge portion
20 Grommet-equipped wire harness
22 Wire harness
30 Grommet
40 Grommet main body
42 Cylinder portion
46 Grommet main body-side locking protrusion
48 Inner member holding portion
50 Large diameter portion
52 Ring-shaped plate portion
54 Ring-shaped portion
55 Ring-shaped seal portion
60 Inner member
62 Inner main body portion
63 Diameter expansion deformation portion
63D Divided portion
65 Protruding support portion
66 Inner member-side locking protrusion
68 Locked portion
69 Pressing piece
70 Guiding portion
72 Guide groove
76 Guiding plate portion
76a Diameter expansion restricting portion
76b Guide protrusion
80 Diameter expansion portion
82 Slide plate portion
84 Standby position holding protrusion
88 Insertion position holding protrusion
100 Temporary locking protrusion
148 Inner member-side locking protrusion

The invention claimed is:

1. A grommet configured to be attached to an attachment hole formed in a panel, comprising:
   a grommet main body configured to be fit into the attachment hole from one end side in an axial direction and including: a cylinder portion made of an elastic material and having an insertion hole through which a wire harness is to be inserted; and a large diameter portion which extends toward an external circumference side from the cylinder portion, and has an outer circumferential portion including a ring-shaped portion that can be arranged on an inner circumference side of the attachment hole; and
   an inner member arranged inside of the ring-shaped portion and configured to change from an initial state to a diameter expansion state causing the ring-shaped portion to elastically perform diameter expansion,
   wherein the inner member includes a pressing portion configured to elastically deform the ring-shaped portion so as to press the ring-shaped portion into an inner circumferential edge portion of the attachment hole in the diameter expansion state, and
   the ring-shaped portion includes a ring-shaped seal portion that is formed so as to protrude in a ring shape, and is pressed into the inner circumferential edge portion of the attachment hole in the axial direction of the attachment hole at a partial location.

2. A grommet configured to be attached to an attachment hole formed in a panel, comprising:
   a grommet main body configured to be fit into the attachment hole from one end side in an axial direction and including: a cylinder portion made of an elastic material and having an insertion hole through which a wire harness is to be inserted; and a large diameter portion which extends toward an external circumference side from the cylinder portion, and has an outer circumferential portion including a ring-shaped portion that can be arranged on an inner circumference side of the attachment hole; and
   an inner member arranged inside of the ring-shaped portion and configured to change from an initial state to a diameter expansion state causing the ring-shaped portion to elastically perform diameter expansion,
   wherein the inner member includes an inner member-side locking protrusion configured to, in the diameter expansion state, cause the ring-shaped portion to elastically deform such that the ring-shaped portion locks onto a circumferential edge portion of the attachment hole from one surface side of the panel.

3. The grommet according to claim 2, wherein
   the large diameter portion includes a grommet main body-side locking protrusion that is next to the ring-shaped portion, significantly protrudes with respect to the ring-shaped portion, and locks onto the circumferential edge portion of the attachment hole from another surface side of the panel.

4. The grommet according to claim 2, comprising,
at a portion of the ring-shaped portion that is elastically deformed by the inner member-side locking protrusion, a temporary locking protrusion that temporarily locks onto the circumferential edge portion of the attachment hole from the one surface side of the panel in a state prior to the elastic deformation.

5. A grommet configured to be attached to an attachment hole formed in a panel, comprising:
a grommet main body configured to be fit into the attachment hole from one end side in an axial direction and including: a cylinder portion made of an elastic material and having an insertion hole through which a wire harness is to be inserted; and a large diameter portion which extends toward an external circumference side from the cylinder portion, and has an outer circumferential portion including a ring-shaped portion that can be arranged on an inner circumference side of the attachment hole; and
an inner member arranged inside of the ring-shaped portion and configured to change from an initial state to a diameter expansion state causing the ring-shaped portion to elastically perform diameter expansion,
wherein the inner member includes: an inner main body portion that includes a C-shaped diameter expansion deformation portion, a divided portion being formed on a portion in a circumferential direction of the diameter expansion deformation portion; and a diameter expansion portion that opens the divided portion by being inserted in the divided portion, causes the diameter expansion deformation portion to perform diameter expansion, and keeps the diameter expansion deformation portion in a diameter expansion state.

6. The grommet according to claim 5, wherein
the inner main body portion includes a guiding portion configured to guide the diameter expansion portion from a standby position withdrawn from the divided portion, to an insertion position inserted into the divided portion.

7. The grommet according to claim 6, wherein
a standby position holding protrusion that restricts movement of the diameter expansion portion from the standby position in a falling-out direction is formed on at least one of the inner member and the diameter expansion portion.

8. The grommet according to claim 6, wherein
an insertion position holding protrusion that restricts movement to the standby position in a state in which the diameter expansion portion has moved to the insertion position is included on at least one of the inner member and the diameter expansion portion.

9. The grommet according to claim 5, wherein
the grommet main body includes an inner member holding portion that holds the inner member equipped on the grommet main body.

10. The grommet according to claim 9, wherein
the inner member holding portion is formed into a shape that protrudes along the axial direction of the large diameter portion from another end portion, and protrudes toward an outer circumference side at its leading end side,
the inner main body portion includes a locked portion that is openably and closably supported by the outer circumference side of the diameter expansion deformation portion,
when the inner member is equipped on the grommet main body, in a state in which the locked portion is open, the locked portion is arranged at a position avoiding interference with the inner member holding portion, and
when the locked portion is closed with the inner member equipped on the grommet main body, the inner member holding portion retains and locks onto the locked portion.

11. The grommet according to claim 5, wherein
the inner main body portion includes:
a pressing piece that is extended toward an outer circumference side of the diameter expansion deformation portion and presses an other end portion of the large diameter portion toward the panel; and
an interposed portion that is extended from a portion of an outer circumferential portion of the diameter expansion deformation portion, along the outer circumferential portion, and with an interval provided with respect to the outer circumferential portion, and is interposed between the other end portion of the large diameter portion and the pressing piece.

12. A grommet-equipped wire harness comprising:
the grommet according to claim 1; and
a wire harness inserted through the cylinder portion.

13. A grommet-equipped wire harness comprising:
the grommet according to claim 2; and
a wire harness inserted through the cylinder portion.

14. A grommet-equipped wire harness comprising:
the grommet according to claim 5; and
a wire harness inserted through the cylinder portion.

* * * * *